May 26, 1942.    R. A. MacARTHUR ET AL    2,284,439
HEAT INSULATION STRUCTURE AND METHOD OF MAKING THE SAME
Filed July 19, 1939    2 Sheets-Sheet 2

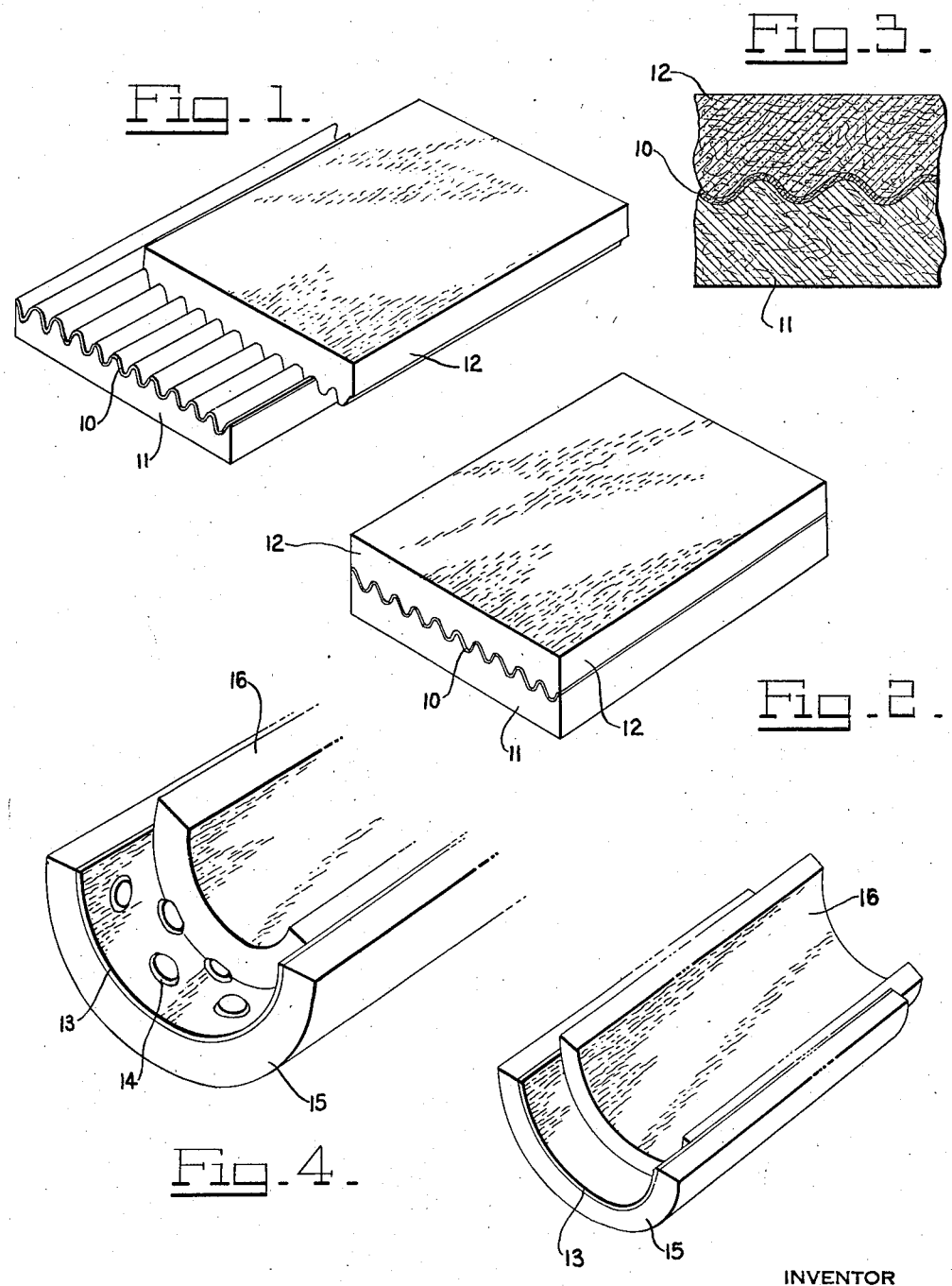

INVENTOR
Roger A. MacArthur
Harold N. Greider
BY
Kenyon & Kenyon
ATTORNEYS

Patented May 26, 1942

2,284,439

UNITED STATES PATENT OFFICE 2,284,439

HEAT INSULATION STRUCTURE AND METHOD OF MAKING THE SAME

Roger A. MacArthur and Harold W. Greider, Wyoming, Ohio, assignors to The Philip Carey Manufacturing Company, a corporation of Ohio Application July 19, 1939, Serial No. 285,300

14 Claims. (Cl. 154—28)

This invention relates to heat insulation structures and method of making same. This invention relates especially to preformed structures comprising molded heat insulation materials and the manufacture thereof.

Heat insulation materials, because of their relatively low conductivity of heat, are used to decrease the transmission of heat energy by conduction or radiation either to or from a particular body. The use of heat insulation to cover boilers, steam piping, etc., thus conserving fuel, is well known. No substance is perfectly efficient as a heat insulation material as all substances conduct heat to a certain extent. Certain materials are, however, more efficient than others. Also the efficiency of a particular material varies with the temperature at which it is used. Those materials having relatively low heat conductivity are known as heat insulation materials and are recognized as a class distinct from ordinary structural materials. Some heat insulation materials, otherwise efficient, cannot endure high temperatures and such materials are referred to as low temperature heat insulation materials. Those heat insulation materials which are adapted to resist relatively high temperatures are known as high temperature heat insulation materials.

It is a purpose of this invention to afford a heat insulation structure which is very high in heat insulation efficiency and which is adapted for use in insulating surfaces that in use are heated to temperatures requiring a high temperature heat insulation in order to withstand the temperature at which the surface to be protected is maintained. It is a further purpose of this invention to afford a preformed structure of the high heat insulation efficiency referred to that can be installed very economically and that can be manufactured by economical production methods.

Heretofore heat insulations have been made by molding slabs of substantial thickness in the form of flat blocks, curved sections suitable for pipe coverings, and the like, from various plastic or semi-plastic compositions that contain heat-insulating and heat-resistant ingredients and that are adapted to become bonded upon molding so that the molded articles will have sufficient strength to stand up in use. One type of heat insulation material that has been extensively manufactured and used is that which is commonly referred to as "85% magnesia." 85% magnesia insulation has heretofore been produced most commonly by rapidly heating a 2% to 3% solution of magnesium bi-carbonate to above about 200° F. to precipitate basic magnesium carbonate. The basic magnesium carbonate thus produced is then incorporated in a slurry, the solid components of which consist of about 85% of the basic magnesium carbonate and about 15% of asbestos fiber. The slurry is molded in filter molds of desired shape under a pressure of about 15 to 40 pounds per square inch and the molded articles are thereafter dried and trimmed to desired dimensions. 85% magnesia insulation is suitable for insulating surfaces which are maintained at about 550° F. or less, but if the insulation is used at temperatures above about 550° F. the basic magnesium carbonate tends to decompose with resultant injury to the physical integrity of the insulation. Moreover, while 85% magnesia insulation has high heat insulating efficiency at temperatures below about 550° F., it has considerably less heat insulating efficiency at higher temperatures. Since 85% magnesia heat insulation material is very extensively used and is ill suited for use at temperatures greatly above about 550° F., insulations of this type, namely, insulations which are particularly suited for use at temperatures below about 550° F., have become known as low temperature heat insulation materials. Heat insulation materials which are adapted for use at temperatures above about 550° F., are commonly referred to as high temperature heat insulation materials.

Heat insulation materials of the character referred to, both low and high temperature insulations, have been made heretofore in the form of molded slabs of substantially uniform characteristics throughout, and the slabs, such as blocks, pipe coverings and the like, have been sold in separate units of standard dimensions for installation on the job.

It is a feature of the present invention that a preformed heat insulation appropriate for sale in the form of units of desired size and shape, comprises in combination a sheet of heat resistant material, together with two layers of molded heat insulation material integrally bonded with opposite sides of the sheet and that the heat insulation material of one of these layers is appropriate for use at higher temperatures than the heat insulation material of the layer on the other side of the sheet. From the point of view of a method of manufacture, it is a further feature of this invention that the sheet of heat-resistant material is first made and thereafter a layer of heat insulation composition is molded on one side of the sheet and another layer of heat insulation composition is molded on the other side of the sheet. In the practice of certain modifications of this invention the layers of heat insulation are molded from aqueous slurries which, after being introduced into the mold, thereafter become set or hardened and are dried. The heat insulation compositions which are used may be adapted to become either set by heating the molded article or by hydraulic setting of the molded article. Preferably the composite heat insulation structure is molded in a common mold comprising portions separated from each other by the sheet of heat-resistant material that becomes embedded in the finished structure. The molds may be of any commonly used construction such as sheet metal or castings, etc.

In order that a clear understanding may be had of this invention, it will be described hereinbelow in connection with certain specific embodiments thereof which are shown in the accompanying drawings, wherein Figure 1 is a perspective view of a preformed heat insulation structure according to this invention in the form of a block with the two layers of heat insulation material offset relatively to each other;

Figure 2 is a perspective view of the preformed heat insulation structure wherein the two layers of heat insulation material are not offset but are in substantial registration with each other;

Figure 3 is a transverse sectional elevation of a portion of the heat insulation structure shown in Figures 1 and 2;

Figure 4 is a perspective view of a heat insulation structure embodying this invention in a form suitable for a pipe covering with the two layers of heat insulation material offset relative to each other, the end portion only being shown;

Figure 5 is a perspective view of a further embodiment of this invention in the form of a heat insulation structure according to this invention suitable for use as a pipe covering, the layers of heat insulation material being offset relative to each other;

Figure 7:
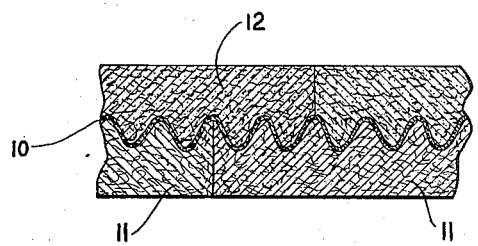
Figure 7 is a transverse sectional elevation of abutting marginal portions of heat insulation units of the type shown in Fig. 1.

Referring to the accompanying drawings, the structure shown in Figures 1, 2 and 3 includes a sheet 10 of some suitable heat-resistant material which in this particular embodiment is corrugated. Integral with one side of the sheet 10 is a layer 11 of molded heat insulation material. Integral with the other side of the sheet 10 is a layer 12 of heat insulation material. The heat insulation characteristics of the material of layer 11 are substantially different from the heat insulation characteristics of the layer 12, as will be brought out more in detail hereinbelow in connection with illustrative examples of heat insulation materials that may be used in these layers. Preferably, the heat resistance of one of the layers is substantially greater than the heat resistance of the other layer. By heat resistance reference is made to the ability of the heat insulation material to resist elevated temperatures without substantial decomposition or other change which results in excessive weakening or other impairment of the molded heat insulation material. In Figure 1 the layer 12 is offset with reference to the layer 11 along two nonparallel edges, although the marginal dimensions of the two layers are the same. In other words, the structure is provided with complementary offset portions both at the ends and at the sides. The structure shown in Figure 2 is similar to that shown in Figure 1 except that the layers 11 and 12 are not offset with respect to each other.

In the embodiment shown in Figures 1, 2 and 3, the layers 11 and 12 may conveniently be about 1½ inches in thickness, for example, and the sheet 10 may be about .02 inch in thickness. The length and width of the layers 11 and 12 may be any desired dimension. When the length is about a foot or more, the offset at the ends may be conveniently about 1 to 2 inches. The offset along the sides may likewise be about 1 to 2 inches, or somewhat less. It is apparent, however, that the thickness of the different layers and the dimensions of the component parts of the structure and the extent of overlap, or offset, if any, of the layers, may be varied as desired.

In Figures 4 and 5 the insulation structure is curved so as to be appropriate for a pipe covering. The showings are the same in Figures 4 and 5, except that in the embodiment shown in Figure 4 sheet 13 of heat-resistant material has indentations 14 therein, whereas in the embodiment shown in Figure 5 the sheet 13 does not. In Figures 4 and 5 the sheet 13 is interposed between the outer layer 15 of heat insulation material and the inner layer 16 of heat insulation material. The heat insulation characteristics of layer 16 differ from the heat insulation characteristics of the layer 15 as will be referred to more in detail below.

In the embodiment shown in Figures 4 and 5, the structure may be of any desired dimensions. For fitting snugly about a 3 inch pipe, for example, the layer 16 may conveniently be about 1 inch in thickness and the layer 15 may conveniently be about 1½ inches in thickness. The sheet 13 may, for example, be approximately .02 inch in thickness. In a pipe covering of these dimensions the offset of the layers 15 and 16 may be about ¼ to ½ inch along the sides and about 1 to 2 inches at the ends. Insulation structures suitable for pipe coverings may, of course, be made with no offset whatever. Moreover, insulation structures of other shapes, either flat or curved, and of any desired size and dimensions may be made embodying this invention.

In order to illustrate one embodiment of this invention, including the constituents of the component parts thereof, it will be described in connection with an illustrative example of a method of manufacturing a heat insulation structure according to this invention. A sheet of asbestos paper is first made by using any suitable paper-making machine. The asbestos paper sheet may be conveniently about .02 inch in thickness. The paper may be used without deforming it as shown in Figure 5. Preferably, however, the paper is deformed as by passing it through a corrugating machine in which it passes between corrugated rolls which compress the paper and leave permanent corrugations therein. The corrugated paper may, for example, have the appearance of the sheet 10 shown in Figs. 1 and 2. Alternatively, the paper may be formed to produce indentations such as the indentations 14 shown in Fig. 4. After the paper is formed it is preferably treated with some binder to impart increased stiffness to the paper. For this purpose the paper may be treated, for example, with a dilute solution of sodium silicate, e. g., a solution made up of 1 part of sodium silicate of 42° Baumé gravity with 1 part of water. The ratio of sodium oxide to silicon oxide in the sodium silicate is 1 to 3.25. The sodium silicate solution may be applied to one or both sides of the paper. If it is applied to one side only of the paper it is preferably applied so as to penetrate substantially completely through the paper. After the paper has been impregnated with the sodium silicate solution, it is dried. The drying can be accelerated by employment of elevated temperatures, e. g., about 250° F., or by using blasts of air or by both of these expedients. The paper can be used as made up in this way, although it is preferable to coat the paper so as to impart increased stiffness thereto. For example, the paper may be coated with a sodium silicate solution mixed with some finely-divided filler such as silica flour, clay, ground marble, or the like. Alternatively, the paper can be coated with an aqueous mixture of plastic magnesia cement (a mixture of magnesium chloride and magnesium oxide) and some inorganic filler such as silica flour. Such a cement forms a superficial hydraulically set coating that imparts considerable added stiffness to the paper. Another alternate treatment for the paper is to treat it with magnesium sulphate solution so as to impart increased water resistance as described in our application, Serial No. 82,256, filed May 28, 1936, for Indurated thermal insulating material. The sheet of asbestos fiber impregnated with silicate of soda and with or without a supplementary coating, is semi-rigid and is well adapted for use in molding the heat insulation in the manner to be described.

Figures 6, 8:
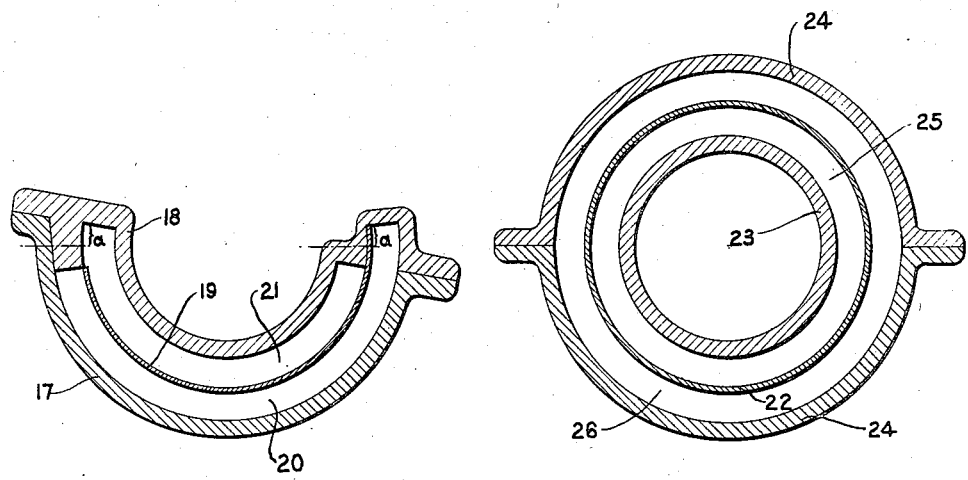
Figure 6 is a horizontal sectional view of one form of mold which can be used in the manufacture of one type of heat insulation embodying this invention.
Figure 8 is a horizontal sectional view of another form of mold which can be used in the manufacture of a heat insulation embodying this invention.

After the sheet of heat-resistant material has been formed, the sheet is placed in a suitable mold such as the mold shown in Fig. 6. While the mold is shown curved, it is apparent that a mold of any other shape can be used. A semi-rigid sheet, such as the sheet above described, can readily be curved as shown in Fig. 6. The mold shown in Fig. 6 is made up of an outer section 17 and an inner section 18 which sections can be secured together in any suitable way. The sheet of impregnated asbestos fiber is indicated generally by the reference character 19 and is interposed between the sections 17 and 18 and in effect divides the interior of the mold into two portions. The sheet 19 may be either substantially uniform as shown in Fig. 5 or deformed as shown in Figs. 1, 2 and 4. The composite insulation is then molded by introducing one type of heat insulation composition in the form of a slurry into the portion of the mold on one side of the sheet 19 and another type of heat insulation composition in the form of a slurry into the portion of the mold on the other side of the sheet 19. The sheet 19 being continuous, and being disposed so as to separate the two portions of the mold from each other, prevents the two types of insulating compositions from intermingling, and as is apparent, the two types of insulation composition are molded integrally with the sheet 19. If the heat insulation compositions are of a type which are set by heat, the molded article is heated so as to cause the heat insulation materials to set. Alternatively, the heat insulation compositions may set hydraulically and will become sufficiently set and hardened to permit removal of the forms from the molded article merely by permitting the molds to stand for a suitable interval of time. After the heat insulation compositions have set they can be removed from the molds and set aside for drying.

Another preferred method of molding pipe covering is shown in Fig. 8, wherein the sheet 22 of stiffened fabric is introduced into the mold (consisting of mandrel 23, outer sections 24 detachably secured together in any suitable way) as a cylinder positioned to afford a separating layer on the two sides of which the high and low temperature insulating slurry may be poured into portions 25 and 26 respectively of the mold. Following setting the complete section of pipe covering may be removed from the mold and dried. It may then be cut along its long axis to form two half-sections of covering. An advantage of this method is that the sheet 22 may be held easily in the mold, and the whole section may be made in one operation. One method of making the cylindrical sheet 22 is to wind several continuous wraps of fabric on a mandrel of proper size, with suitable adhesive such as sodium silicate to adhere the layers together. The cylinder may then be painted or otherwise coated with, for example, dilute sodium silicate to harden it.

The heat insulation compositions used in making the composite structure may be selected from a variety of insulations of the heat-setting or hydraulically-setting type. One preferred type of heat insulation for employment in the composite structure of this invention is made by preparing an aqueous slurry containing as solids about 89% of finely-divided normal magnesium carbonate crystals and about 11% of asbestos fiber. This slurry is poured into the mold in a semi-fluid condition, there being present about 3.5 parts of water to each part of solids. The heat insulation material, after being poured into the mold, can be set merely by heating the mold to above about 160° F., and preferably to about 185°, to convert the normal magnesium carbonate to basic magnesium carbonate. The resulting heat insulation is "85% magnesia" and is a low temperature heat insulation of high thermal efficiency at temperatures below about 550° F. The heat insulation material is notable for the fact that it sets without substantial shrinkage and will set to form a slab of sufficient strength even though no molding pressure is used. Low temperature heat insulations made from aqueous slurries containing a major proportion of finely-divided normal magnesium carbonate crystals have preferred characteristics for use according to this invention both from the point of view of the method of manufacture and the finished product. Such low temperature insulation materials may compose the layer 12 in the embodiment shown in Figs. 1, 2 and 3. When the composite structure is to be used as a pipe covering the low temperature heat insulation is used as the outside layer 15 as shown in Figs. 4 and 5 and is molded in the portion 20 of the mold shown in Fig. 6 or the portion 26 of the mold shown in Fig. 8.

The layer of low temperature insulation material is used in the specific structure described by way of exemplification in combination with a high temperature heat insulation material on the opposite side of the intermediate sheet. The high temperature heat insulation may be a heat insulation made according to the method described in our application Serial No. 283,066, filed July 6, 1939, for Manufacture of heat insulation material and composition therefor and resulting product, which was executed on even date herewith and which has resulted in Patent No. 2,262,953, issued November 18, 1941. The insulation may, for example, be molded from an aqueous slurry containing as solids 45 parts of normal magnesium carbonate, 13 parts of asbestos fiber and 42 parts of calcium carbonate, and containing about 2.25 parts of water to each part of solid ingredients. This insulation material may be molded in the portion 21 of the mold shown in Fig. 6 or portion 25 of the mold shown in Fig. 8. After the slurry has been poured into the mold, it can be set by heating the formed article to above about 160% F., and preferably to about 185° F., to convert the normal magnesium carbonate to basic magnesium carbonate. The heat insulation thus prepared is suitable for resisting higher temperatures than can be resisted by the 85% magnesia insulation molded in the portion 20 of the mold shown in Fig. 6 or in the portion 26 of the mold shown in Fig. 8, and is suitable for use in direct contact with surfaces at temperatures ranging from about 550° F., to about 1200° F. This molded and set heat insulation material may be the layer 12 shown in Figs. 1, 2 and 3 and the layer 16 shown in Figs. 4 and 5.

The advantages of the structure above described are believed to be apparent. When the composite structure is positioned at the surface to be insulated, which surface is to be maintained at a temperature about 550° F., to 1900° F. for example, the high temperature insulation is placed in close proximity to the surface, the low temperature insulation being on the outside. The low temperature insulation of the outer layer has greater heat insulation efficiency at the lower temperatures adjacent the outside of the insulation than the high temperature insulation of the inner layer would have. Moreover, since the inner layer of high temperature insulation protects the outer layer of low temperature inslulation, the outer layer of low temperature insulation can be composed of materials which are not as resistant to impairment by heat as are the ingredients of the high temperature heat insulation of the inner layer. In this way a composite product is afforded which has a maximum degree of heat insulation efficiency and which at the same time is adapted to resist the heat to which the component parts of the structure are subjected in service.

A product having the high degree of heat insulation efficiency above referred to can be installed in a very economical manner. In order to achieve an equally high heat insulation efficiency using heat insulations at present on the market, it would be necessary to make high temperature heat insulation blocks and to separately make low temperature heat insulation blocks and first install the high temperature heat insulation and follow such insulation by a second insulation of an overlying layer of low temperature heat insulation. The composite structure of this invention can, on the other hand, be installed in a single operation and the installation cost is, therefore, very greatly reduced. Moreover, since the composite structure of this invention can be made by a single molding operation, it is apparent that the cost of production is greatly reduced as compared with separately molding and trimming to desired dimensions blocks of high temperature heat insulation, on the one hand, and blocks of low temperature heat insulation on the other hand. In this connection, it is preferable in the manufacture of a heat insulation structure according to this invention to substantially simultaneously mold the layers of high and low temperature material on opposite sides of the heat resistant sheet material. In any event, it is desirable to mold each layer of heat insulation material before the other layer has become set and dried. However, while it is preferable to make the heat insulation material in this manner, it is not essential, inasmuch as one layer of the heat insulation material can be molded integrally with one side of the sheet of heat-resistant material and caused to become set, the other layer of heat insulation material being molded subsequently.

Instead of using a heat insulation composition which is of the heat setting type, namely, an insulation which is first molded and then set by heating, an insulation may be used which sets hydraulically. For example, as a high temperature heat insulation composition, a mixture of diatomaceous earth, asbestos fiber and high alumina fused cement is suitable. For example, a mixture containing about 25% high alumina cement, about 70% of diatomaceous earth, and about 5% of asbestos fibre may be used. The mixture is made up as a typical aqueous cement mix or slurry and then is introduced into the mold and permitted to set hydraulically.

Similarly, a low temperature heat insulation composition which sets hydraulically may be used. A mixture of gypsum and diatomaceous earth is suitable for this purpose. For example, an insulation may be made containing 70% of diatomaceous earth, 25% of gypsum and 5% of asbestos fiber. Such a mixture, when made up into an aqueous paste or slurry, will set hydraulically in the mold.

Exfoliated mica may be used in the low temperature heat insulation component of the structure, as by using it with a minor proportion of Portland cement binder. A mixture containing about 40% of exfoliated mica, about 5% of asbestos fiber and about 55% of Portland cement is suitable.

Another example of a high temperature heat insulation material which is adapted to be set by heating consists principally of a mixture of calcium oxide and calcined diatomaceous earth. For example, a material containing about 30% of calcium oxide, about 65% of calcined diatomaceous earth, about 5% of asbestos fiber may be molded in the form of a semi-plastic slurry. Upon heating the mold under steam pressure in a closed chamber the lime reacts with the diatomaceous earth to form calcium silicate, which acts as a bonding agent for the insulation material.

The intermediate sheet in the insulation structure is preferably deformed so as to increase the surface area thereof for a given unit size of the insulation structure. This is of advantage in obtaining a very strong bond between the two layers or slabs of heat insulation material on opposite sides of the sheet. Moreover, when one of the layers or slabs is offset with respect to the other, deformations having a keying action which prevents the pulling apart of contiguously positioned blocks of the insulation may be used. It is desirable to have the exposed and offset portion of one of two juxtaposed surfaces of the insulation structure provided with deformations therein that vary in depth in the direction of the offset and to have the corresponding exposed and offset portion of the other of the juxtaposed surfaces provided with complementary deformations therein. Thus, for example, referring to Figs. 1 and 7, it is apparent that the corrugations of the sheet 10 will interlock with the exposed corrugated surface of the layer or slab 12 of another contiguous composite insulation structure so as to prevent two contiguous composite structures from spreading apart along the abutting side edges thereof. Similarly, in the structure shown in Fig. 4, the indentations 14 in the sheet 13 will interlock with complementary recesses in the layer 16 of the composite structure so as to prevent two units of the insulation placed in endwise abutment from being pulled apart.

By having the layers of insulation material of the composite structure offset relatively to each other the occurrence of cracks or gaps extending inwardly to the surface to be protected and between contiguous units of the composite structure is minimized. When curved insulation units are made such as shown in Figs. 4 and 5 with the layers or slabs of insulation material offset relatively to each other along the side edges thereof, it is preferable to construct the insulation so that the ends of the layers adapted for complementary positioning with another similarly formed insulation unit will be straight rather than curved throughout the portions thereof that extend beyond the diameter of the insulation that approximately bisects the offset portions of the layers. For this purpose it is desirable, for example, to construct the mold used in making the insulation so that the portions $a$ indicated in Fig. 6 are straight and perpendicular to the diameter of the insulation that bisects the offset portions of the layers.

While the intermediate sheet of the composite heat insulation structure has been described hereinabove as being composed of mineral fiber, it is apparent that other sheet materials may be used. It is desirable that the intermediate sheet have sufficient resistance to water so as not to be excessively softened during the molding and setting of an aqueous slurry. It is preferable that the sheet be semi-rigid so as to more readily be maintained in proper position in the mold. Moreover, the intermediate sheet should be made of a material which is adapted to resist the temperatures that are to be encountered thereby in the intended use of the heat insulation material. Preferably the intermediate sheet should be made of some material which can be readily cut along with the overlying layers or slabs of heat insulation material so that large preformed units can, if desired, be cut into smaller units. While the intermediate sheet is ordinarily a single layer of material, it is apparent that built up sheets may be used and that the sheet may be made as above described in the form of a suitable foundation sheet coated with one or more coatings of material such as waterproofing agents or stiffening agents.

While this invention has been described in connection with certain specific embodiments thereof, it is to be understood that this has been done merely for the purpose of exemplification. Thus it is apparent the dimensions of the component elements or parts of the heat insulation structure may be varied widely. Some of the advantages of the structure as a preformed article of manufacture are afforded even though one or both of the layers of heat insulation material are not molded integrally with the intermediate sheet of heat-resistant material. Thus the layers of different heat insulation materials might be first molded and subsequently integrally bonded with the intermediate sheet of heat-resistant material, as by the use of an adhesive such as sodium silicate, or by some mechanical securing means such as staples or brads. However, it is distinctly preferable to first make the sheet of heat-resistant material and thereafter mold the heat insulation composition of one and preferably both layers of the heat insulation structure integrally with the intermediate sheet not only because of the economy of this method of manufacture but also because of the superior strength of the bond with the sheet material that can be obtained by molding a slurry in contact with the sheet material and causing it to be set while the intimate contact is maintained.

While the heat insulation compositions that are used may be varied, it is distinctly preferable to use heat insulation compositions that can be made into a slurry and that are adapted to set after being molded either by application of heat or by hydraulic action, inasmuch as such heat insulation compositions, after molding, do not shrink excessively during setting and drying. Moreover, it is preferable to employ slurries or aqueous mixes which are adapted to set with application of little or no pressure to form a heat insulation of requisite strength for the intended use.

We claim:

1. A preformed heat insulation structure comprising in combination a sheet of heat resistant material, a first layer of molded heat insulation material of substantially greater thickness than the thickness of said sheet integrally bonded to one side of said sheet and a second layer of heat insulation material of substantially greater thickness than the thickness of said sheet integrally bonded to the other side of said sheet, the heat insulation material of said first layer having substantially greater heat resistance than the heat insulation material of said second layer.

2. A preformed heat insulation structure comprising in combination a corrugated sheet comprising mineral fiber impregnated with sodium silicate, a layer of molded high temperature heat insulation material integrally bonded to one side of said sheet, and a layer of molded low temperature heat insulation material integrally bonded to the other side of said sheet.

3. A preformed heat insulation structure comprising in combination a unitary sheet of heat resistant material, a first layer of molded heat insulation material integrally bonded with one side of said sheet, a second layer of heat insulation material integrally bonded with the other side of said sheet, the heat insulation material of said first layer having substantially greater heat resistance than the heat resistance of the heat insulation material of said second layer, and said layers of heat insulation material being directly bonded to the opposite surfaces of said sheet throughout substantially the entire surfaces of said sheet covered by said layers.

4. An integrally molded preformed heat insulation structure comprising in combination a sheet of heat resistant material comprising fiber, a first layer of substantially greater thickness than the thickness of said sheet of heat insulation molded integrally with one side of said sheet, and a second layer of substantially greater thickness than the thickness of said sheet of heat insulation material molded integrally with the other side of said sheet, the heat insulation material of said first layer having substantially greater heat resistance than the heat insulation material of said second layer, and the heat insulation efficiency of said second layer being greater than the heat insulation efficiency of said first layer at temperatures below about 550° F.

5. An integrally molded preformed heat insulation structure comprising in combination a sheet of heat resistant material comprising mineral fiber, a first layer of substantially greater thickness than the thickness of said sheet of high temperature heat insulation molded integrally with one side of said sheet, and a second layer of substantially greater thickness than the thickness of said sheet of low temperature heat insulation material comprising mineral fiber and a major proportion of basic magnesium carbonate produced by heating normal magnesium carbonate molded integrally with the other side of said sheet.

6. An integrally molded preformed heat insulation structure comprising in combination a sheet of heat resistant material comprising mineral fiber, a layer of substantially greater thickness than the thickness of said sheet of high temperature heat insulation material of the thermo-setting type molded and set integrally with one side of said sheet and a layer of substantially greater thickness than the thickness of said sheet of low temperature heat insulation material of the thermo-setting type molded and set integrally with the other side of said sheet.

7. An integrally molded preformed heat insulation structure comprising in combination a sheet of heat resistant material comprising mineral fiber, a layer of substantially greater thickness than the thickness of said sheet of molded hydraulically set high temperature heat insulation material molded and set integrally with one side of said sheet and a layer of substantially greater thickness than the thickness of said sheet of molded hydraulically set low temperature heat insulation material molded and set integrally with the other side of said sheet.

8. A method of making a heat insulation structure which comprises first making a sheet of heat resistant material and then molding on one side of said sheet in integral relation therewith a first heat insulation composition and molding on the other side of said sheet in integral relation therewith a second heat insulation composition, each of said heat insulation compositions being molded from an aqueous slurry and thereafter set and dried, and said first heat insulation composition having substantially greater heat resistance than said second heat insulation composition.

9. A method of making a heat insulation structure which comprises making a sheet comprising mineral fiber by a paper making operation and impregnating said sheet with a binder to impart stiffness thereto and then molding on one side of said sheet in integral relation therewith a first heat insulating composition and molding on the other side of said sheet in integral relation therewith a second heat insulation composition, each of said heat insulation compositions being molded from an aqueous slurry in a portion of a common mold separated by said sheet from the other portion and thereafter set and dried, and said first heat insulation composition having substantially greater heat resistance than said second heat insulation composition.

10. A method of making a heat insulation structure which comprises making a sheet of heat resistant material and then molding on one side of said sheet in integral relation therewith a high temperature heat insulation composition and molding on the other side of said sheet in integral relation therewith a low temperature heat insulation composition, each of said heat insulation compositions being molded from an aqueous slurry and the molding of both of said compositions being completed before either is set sufficiently to be removed from the mold.

11. A method of making a heat insulation structure which comprises forming a sheet of heat resistant material comprising mineral fiber, molding on one side of said sheet in integral relation therewith a heat insulation composition adapted to set upon heating to form a high temperature insulation, molding on the other side of said sheet in integral relation therewith an aqueous slurry that comprises normal magnesium carbonate and mineral fiber and that is adapted upon heating to set by conversion of said normal magnesium carbonate to basic magnesium carbonate to form a low temperature heat insulation, and heating the molded material to set said high and low temperature heat insulations in integral relation with said sheet on the opposite sides thereof.

12. A method of making a heat insulation structure which comprises forming a semi-rigid asbestos paper sheet impregnated with a binder comprising sodium silicate and then molding on one side of said sheet in integral relation therewith a first aqueous slurry comprising normal magnesium carbonate and mineral fiber and molding on the other side of said sheet in integral relation therewith a second aqueous slurry comprising normal magnesium carbonate and mineral fiber, said first slurry containing ingredients having greater heat resistance than the ingredients of said second slurry, heating the composite insulation thus formed to convert said normal magnesium carbonate in said slurries while moist to basic magnesium carbonate, and then drying said composite insulation.

13. A method of making a heat insulation structure which comprises forming a semi-rigid asbestos paper sheet impregnated with a binder comprising sodium silicate and then molding on one side of said sheet in integral relation therewith a first aqueous slurry comprising a hydraulically setting binder and molding on the other side of said sheet in integral relation therewith a second aqueous slurry containing a hydraulically setting binder, said first slurry containing ingredients having greater heat resistance than the ingredients of said second slurry, and permitting the said slurries in the composite insulation to set and dry.

14. A method of making a heat insulation structure which comprises first making a sheet of heat resistant material comprising mineral fiber and then molding on one side of said sheet in integral relation therewith a first slab of heat insulating composition and molding on the other side of said sheet in integral relation therewith a second slab of heat insulation composition in offset relation to said first slab.

ROGER A. MacARTHUR.
HAROLD W. GREIDER.

CERTIFICATE OF CORRECTION.

Patent No. 2,284,439.   May 26, 1942.

ROGER A. MacARTHUR, ET AL.

It is hereby certified that error appears in the printed specification of the above numbered patent requiring correction as follows: Page 4, first column, line 39, for "close" read --closest--; line 47-48, for "insluation" read --insulation--; lines 67 and 68, for "insulation by a second insulation" read --installation by a second installation--; and that the said Letters Patent should be read with this correction therein that the same may conform to the record of the case in the Patent Office.

Signed and sealed this 22nd day of September, A. D. 1942.

(Seal)

Henry Van Arsdale,
Acting Commissioner of Patents.